(12) United States Patent
Blood (10) Patent No.: US 11,490,588 B2
(45) Date of Patent: Nov. 8, 2022

(54) PET CARRIER MOUNTABLE ON A BICYCLE'S HANDLEBAR OR A CAR'S SEAT

(71) Applicant: Garrett Blood, Lehi, UT (US)

(72) Inventor: Garrett Blood, Lehi, UT (US)

( * ) Notice: Subject to any disclaimer, the term of this patent is extended or adjusted under 35 U.S.C. 154(b) by 165 days.

(21) Appl. No.: 16/916,391

(22) Filed: Jun. 30, 2020

(65) Prior Publication Data

US 2020/0329666 A1 Oct. 22, 2020

Related U.S. Application Data

(60) Provisional application No. 62/869,127, filed on Jul. 1, 2019.

(51) Int. Cl.
| | |
|---|---|
| *A01K 1/02* | (2006.01) |
| *B60R 7/04* | (2006.01) |
| *B62J 9/30* | (2020.01) |
| *B62J 9/21* | (2020.01) |
| *B62J 9/27* | (2020.01) |

(52) U.S. Cl.
CPC .......... *A01K 1/0281* (2013.01); *A01K 1/0245* (2013.01); *A01K 1/0272* (2013.01); *B60R 7/043* (2013.01); *B62J 9/21* (2020.02); *B62J 9/27* (2020.02); *B62J 9/30* (2020.02)

(58) Field of Classification Search
CPC ............................. A01K 1/0272; A01K 1/0281
See application file for complete search history.

(56) References Cited

U.S. PATENT DOCUMENTS

| | | | | |
|---|---|---|---|---|
| 4,010,880 | A * | 3/1977 | Guillot-Munoz | A01K 1/0272 119/28.5 |
| 4,977,857 | A * | 12/1990 | Slawinski | A01K 1/0254 119/497 |
| 5,577,646 | A * | 11/1996 | White | B62J 9/23 224/431 |
| 5,718,191 | A * | 2/1998 | O'Donnell | A01K 1/0281 119/771 |
| 6,179,183 | B1 * | 1/2001 | Kloster | B62J 11/00 119/500 |
| 6,425,349 | B1 * | 7/2002 | Laskin | A01K 1/0245 119/496 |
| 11,213,005 | B1 * | 1/2022 | Wright | A01K 1/0245 |
| 2005/0217599 | A1 * | 10/2005 | Varner | A01K 1/0281 119/496 |

(Continued)

*Primary Examiner* — Tien Q Dinh
*Assistant Examiner* — Katelyn T Truong (57) ABSTRACT

Presented is a pet carrier for retaining small pets. The pet carrier essentially includes a carrier body and a carrier support arrangement for mounting the carrier body on the bicycle's handlebars or the car's seat. The carrier body includes a front door section, a head section, and a base section. The carrier body also includes a built-in handle at the head section enabling a user to carry the pet carrier from one location to another. The front door section is selectively openable and includes a self-locking latch mechanism that self-locks, when a user places the pet inside the pet carrier and closes the front door section. Further, the base section of the pet carrier includes a mounting/dismounting mechanism that allows the carrier body to click or attach onto the carrier support arrangement designed to removably mount the carrier body on to a bicycle's handlebar or a car's seat.

12 Claims, 11 Drawing Sheets

(56) References Cited

U.S. PATENT DOCUMENTS

| | | | | |
|---|---|---|---|---|
| 2005/0284403 | A1* | 12/2005 | Delino | A01K 1/0245 |
| | | | | 119/497 |
| 2007/0251464 | A1* | 11/2007 | Chen | B62K 7/00 |
| | | | | 119/496 |
| 2008/0257276 | A1* | 10/2008 | White | B62J 9/21 |
| | | | | 224/420 |
| 2013/0125827 | A1* | 5/2013 | Pietra | A01K 1/0272 |
| | | | | 119/496 |
| 2013/0199457 | A1* | 8/2013 | Frasier | B68C 1/20 |
| | | | | 119/496 |
| 2013/0220231 | A1* | 8/2013 | Hovsepian | B62J 9/24 |
| | | | | 119/496 |
| 2019/0254252 | A1* | 8/2019 | Johnson, Jr. | B62J 9/23 |

* cited by examiner

PET CARRIER MOUNTABLE ON A BICYCLE'S HANDLEBAR OR A CAR'S SEAT

CROSS-REFERENCE TO RELATED PATENT DOCUMENTS

This patent application claims the benefit of priority of U.S. Provisional Application No. 62/869,127, entitled "PET CARRIER AND METHOD FOR MOUNTING THE SAME ON A BICYCLE'S HANDLEBARS OR A CAR'S SEAT," filed Jul. 1, 2019, which is hereby incorporated by reference in its entirety.

FIELD OF THE INVENTION

The present invention relates generally to pet carriers. Particularly, the present invention relates to a pet carrier for small pets (such as dogs, cats etc) that can be mounted on a bicycle's handlebar or on a car's seat.

BACKGROUND

Figure 1:
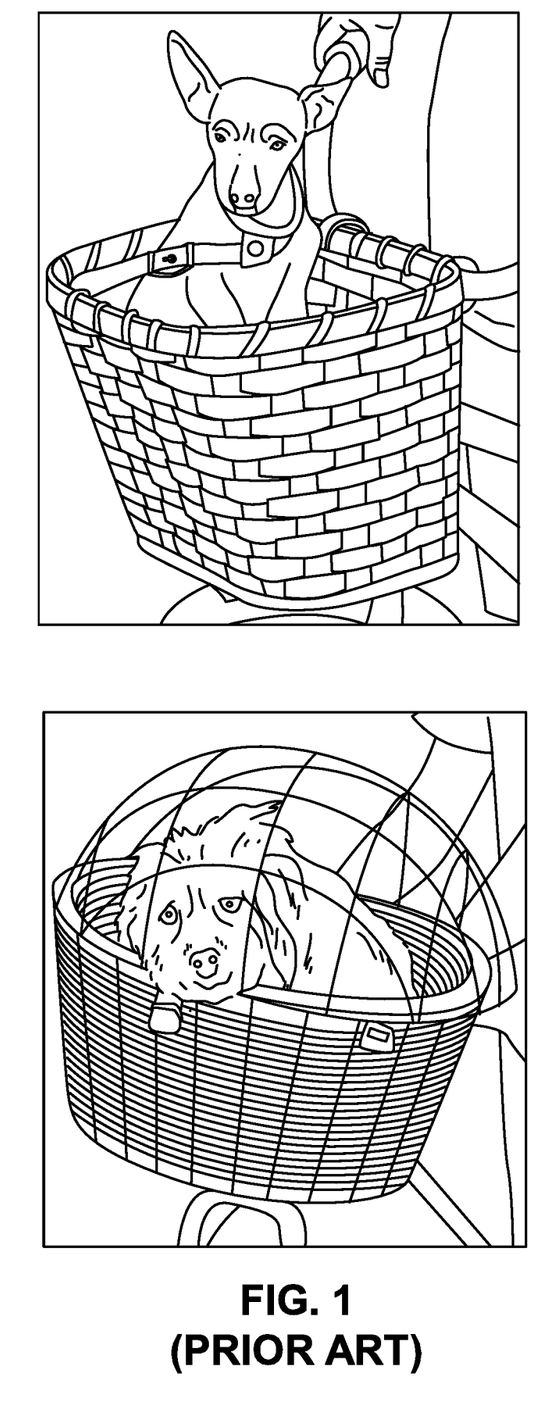
FIG. 1 shows exemplary prior art pet carriers.

Pet carriers have been in use for years. Typically, as shown in FIG. 1, different forms of pet carriers are available which are either configured in the form of a basket without any retaining feature for not letting a pet to escape, or configured in the form of an open basket with flowers to retain the pet within the basket to prevent the pet from escaping. These and other similar kinds of traditionally used pet carriers are not pet friendly, lack aesthetic appearance, unsafe for the pet and are uneasy to mount on transporting vehicles such as a bicycle's handlebar or a car's seat.

In the past, a lot of inventors have proposed different types of pet carriers. For example, JP2006015836 discloses a pet storage box mountable inside the vehicle body (inside vehicle's cabin in particular) tied to a vehicle's seat. As disclosed in the Japanese patent document, the vehicle mounting structure is constituted such that the pet storage box can be connected to an anchor fixed to a reinforcement member through a connection member.

US20050284403 discloses a pet carrier configured for attachment to bicycles. As disclosed in the US patent document, the pet carrier comprises a carrier body and a carrier support apparatus attached to the carrier body. The carrier support apparatus is selectively attachable to and detachable from the carrier body and is configured for being attached to a structural component of the bicycle. Further, the carrier support apparatus includes a universal mounting base configured for being selectively attachable to and detachable from the carrier body and includes an application-specific mounting bracket configured for being attached between the universal mounting base and a structural component of a designated bicycle.

US20130239902 discloses a pet cage for attachment to a trailer hitch of a vehicle. As disclosed in the US patent application, the pet cage includes a floor, one or more sidewalls, and a top panel. The floor, the sidewalls and the top panel are attached together to form an enclosed space for accommodating a pet, a door fitted in one of the sidewalls, and a support attached to the floor, the sidewalls and/or the top panel for supporting the cage above ground, the support having a coupling end for attachment to the trailer hitch of the vehicle.

US20090114688 discloses an animal carrier suitable for mounting behind a cyclist seat such as behind the motorcycle seat and above the rear motorcycle wheel.

Likewise, many other prior arts such as CN208113692, JP2002114105, and US20160113237A1 also disclose different types of pet carriers. Although, different forms of the pet carriers have existed in the past, and many inventors have continued to improvise the pet carrier designs, these prior pet carriers have their own shortcomings or limitations, thus there exists a need for a more reliable and novel solution. Inventor herein proposes a pet carrier that is easily mountable and removed from a bicycle's handlebar or added or removed from a car's seat. The pet carrier can be removed from a car and immediately mounted to a bike and back again.

BRIEF SUMMARY

It is an objective of the present invention to provide a pet carrier for small pets (such as dogs, cats etc) that can be detachably mounted on a bicycle's handlebar or on a car's seat.

It is another objective of the present invention to provide a pet carrier that is ergonomically designed in the shape of a protective racing helmet.

Embodiments of the present invention disclose a pet carrier (100). The pet carrier (100) includes a carrier body (102) comprising a front door section (102a), a head section (102b), and a base section (102c), the front door section (102a) is coupled to the head section (102b) and is selectively operable to open or close; at least a first carrier support arrangement (109) selectively attachable to and detachable from the carrier body (102) and configured for being removably attached to a structural component (202) of a bicycle (200); or a second carrier support arrangement (304) selectively attachable to and detachable from the carrier body (102 or 302) and configured for being removably attached to a car's seat (402).

According to the embodiment, the front door section (102a) of the carrier body (102) having a self-locking latch mechanism (107) to allow locking and unlocking the front door section (102); and the base section (102c) of the carrier body (102) having a pull button (108) operationally connected to a mounting and dismounting mechanism configured on the base section (102c) to allow the carrier body (102) to removably attach to or detach from the first carrier support arrangement (109), or the second carrier support arrangement (304).

These and other features and advantages of the invention will become apparent from the detailed description below in light of the accompanying drawings.

BRIEF DESCRIPTION OF THE ACCOMPANYING DRAWINGS

The foregoing summary, as well as the following detailed description of preferred embodiments, is better understood when read in conjunction with the appended drawings. There is shown in the drawings example embodiments, however, the application is not limited to the specific system and method disclosed in the drawings.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of components, which constitutes a pet carrier and a carrier support arrangement that attaches or detaches to and from the body of the carrier to removably attach the pet carrier on a bicycle's handlebar or a car's seat. Accordingly, the components have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the present invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the present invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment. Further, the words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

The various features and embodiments of a pet carrier of the present invention are better explained with reference to FIGS. 1-11.

Figure 2:
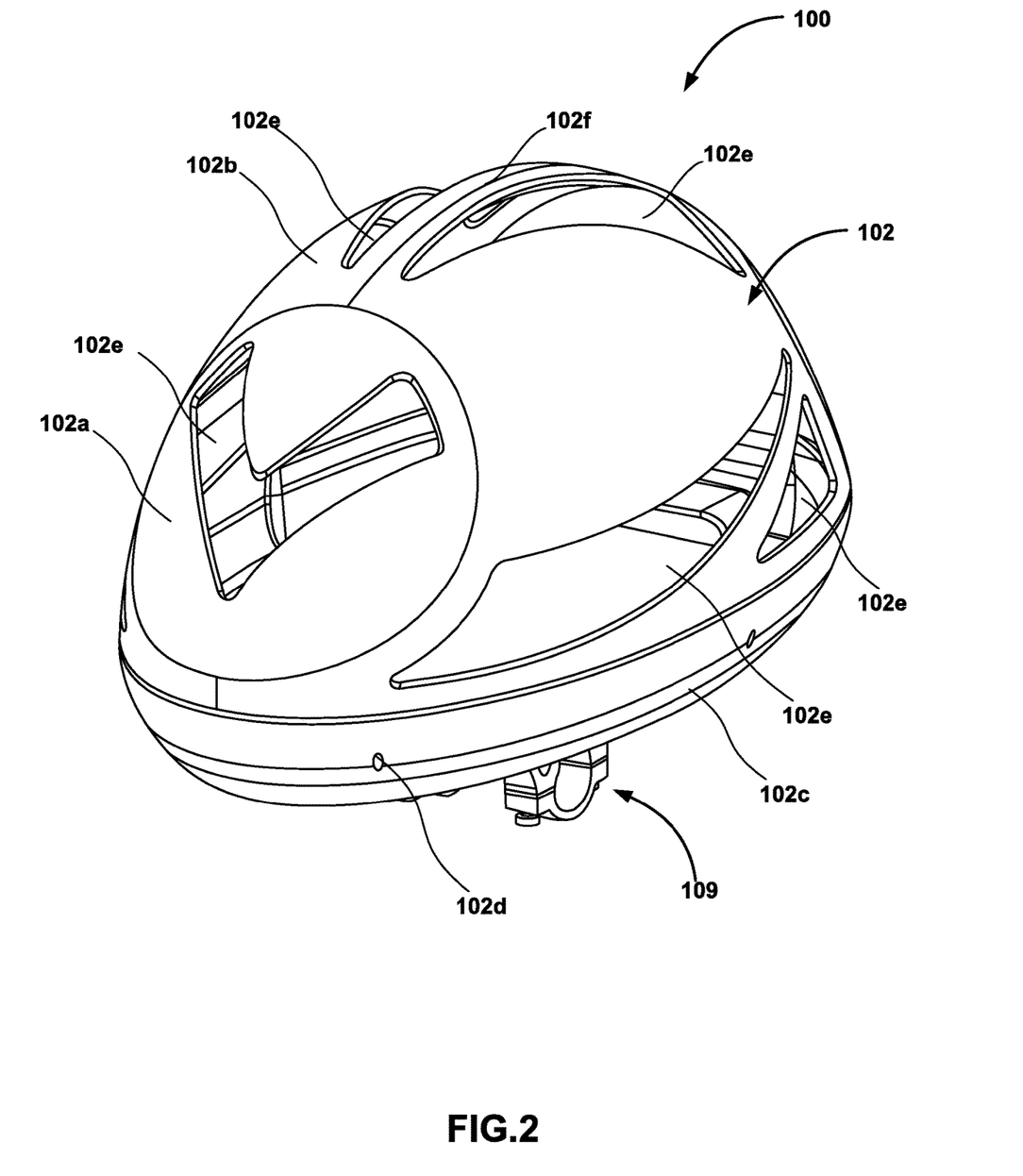
FIGS. 2-3 shows a pet carrier mountable on a bicycle's handlebar, according to an exemplary embodiment of the present invention.
Figure 3:
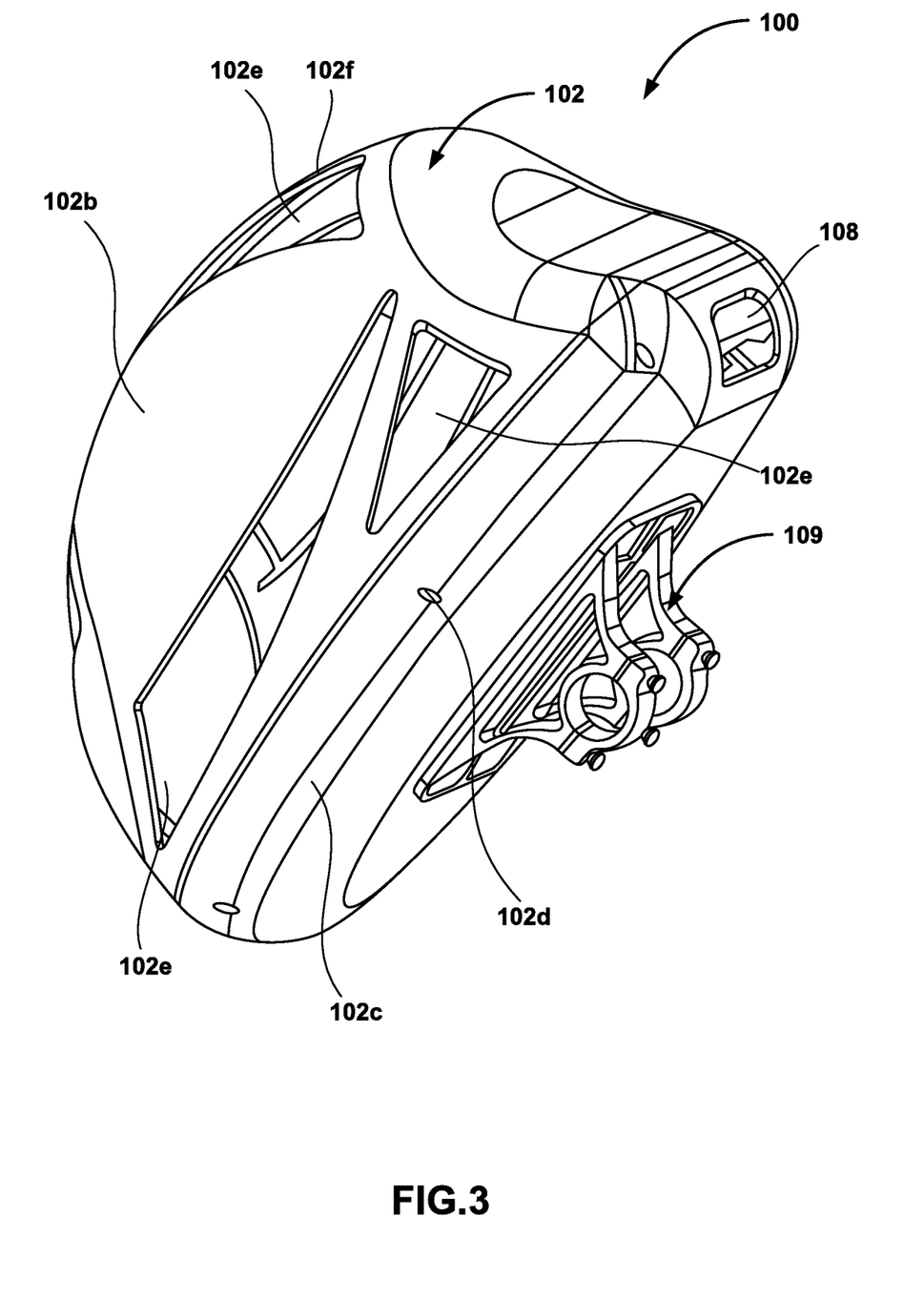
Figure 8:
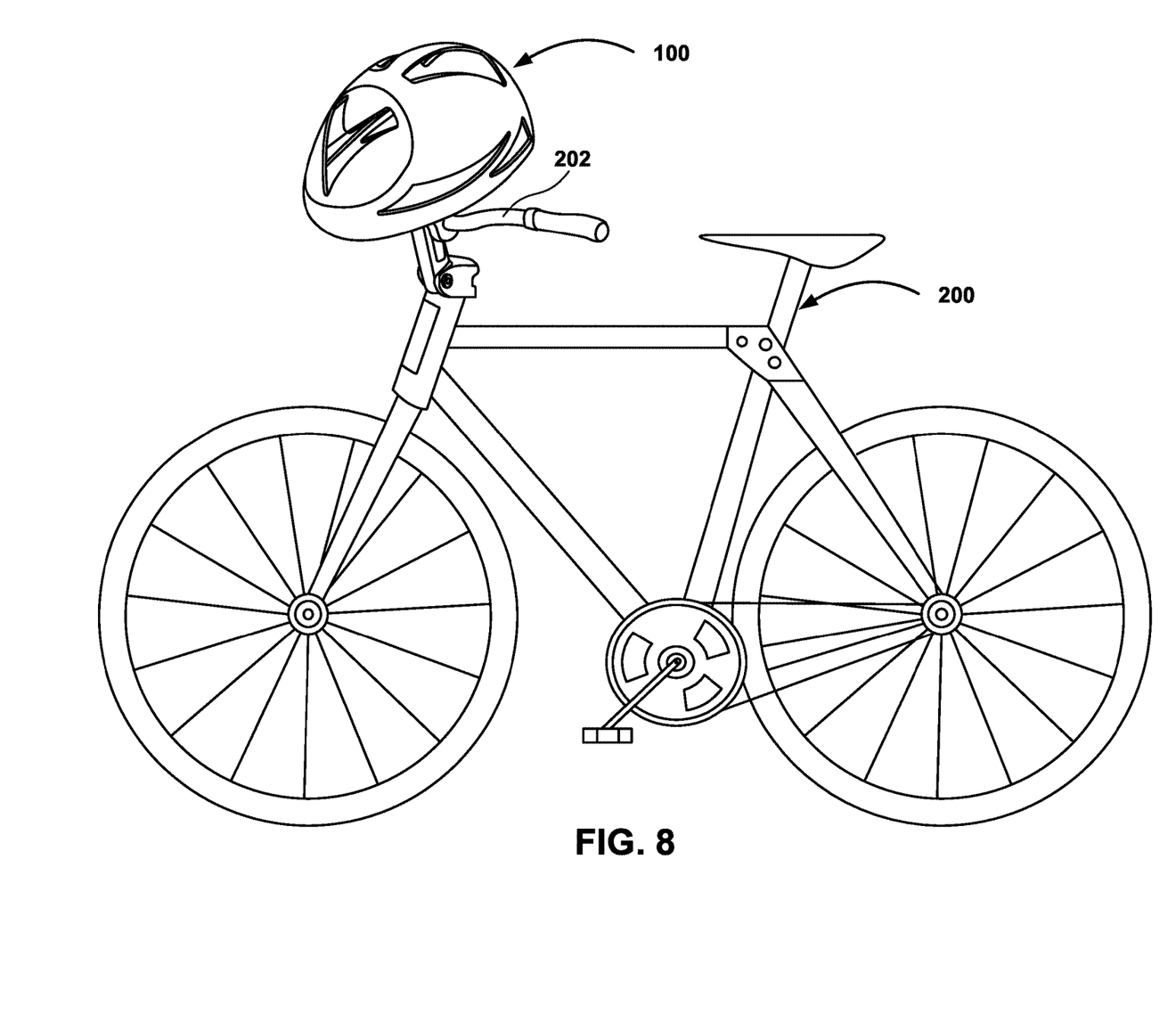
FIG. 8 shows the pet carrier of FIGS. 2 and 3 mounted on the bicycle's handlebar.

Referring to the accompanying figures, particularly to FIGS. 2-3, the pet carrier or pet carrier assembly includes a carrier body 102, and a carrier support arrangement 109 for removably mounting the carrier body 102 on a bicycle's handlebar 202 (as shown in FIG. 8). The carrier body 102 is ergonomically designed preferably in the shape of a protective racing helmet. It should be understood that the shape of the carrier body 102 can vary.

Figure 4:
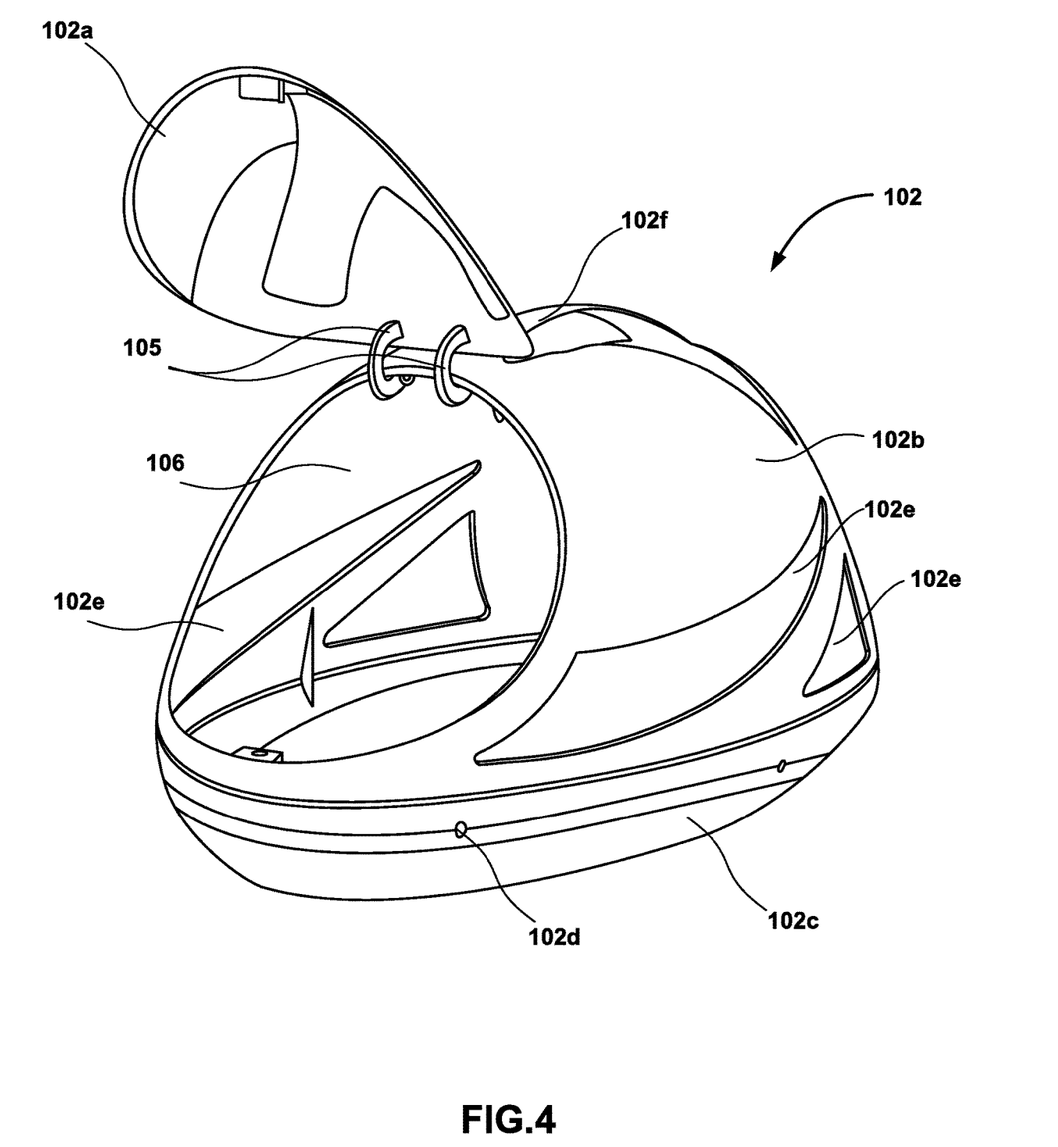
FIG. 4 shows a carrier body portion of the pet carrier with its front door section in an opened state.

In an embodiment, as shown in FIG. 4, the carrier body 102 may be made of three sections, namely a front door section 102a, a head section 102b, and a base section 102c. The door section 102a may be hingedly connected (using a hinge 105) to the head section 102b to hingedly open in an upward direction creating an entry and exiting point 106 for an intended pet to be carried inside the pet carrier 100. The head section 102b is preferably screwed to the base section 102c using suitable fasteners threaded through a set of guides 102d configured on the base section 102c and a set of corresponding guides (not seen) present in the head section 102b. In other embodiments, the head section 102b may snap fit onto the base section 102c. In some other embodiments, other methods to interconnect these two sections 102b, 102c may be employed. In an alternative embodiment, instead of three piece configuration, the carrier body 102 may be configured as two piece product by combining the base section 102c and the head section 102b as single unit.

As seen in FIGS. 1 and 2, the carrier body 102 of the pet carrier 100 comprises one or more openings 102e. The openings 102e are strategically designed and positioned over the carrier body 102 in a way to complement to the shape of the carrier body 102. The openings 102e allow air to pass in/out of the carrier body 102. Further, the openings 102e may also be useful to facilitate the pet retained inside the carrier body 102 to view outside while the pet is being transported inside the pet carrier 100. In particular, the openings 102e are configured on either sides of the head section 102b (although openings on one side is visible) and/or on top of the head section 102b of the carrier body 102. The one or more openings 102e is also present in the front door section 102a. The openings 102e are sized large enough to allow adequate amount of air to pass in and out of the carrier body 102 and allow the pet retained inside the carrier 100 to view outside. At the same time, the openings 102e are sized to restrict the escaping of the pet out of the carrier body 102. The carrier body 102 further comprises a built-in handle 102f configured at the top head section 102b. The handle 102f facilitates portability for the pet carrier 100. The user can hold the handle 102f to carry the pet carrier 100 or the carrier body 102 from one place to other.

Figure 7A:
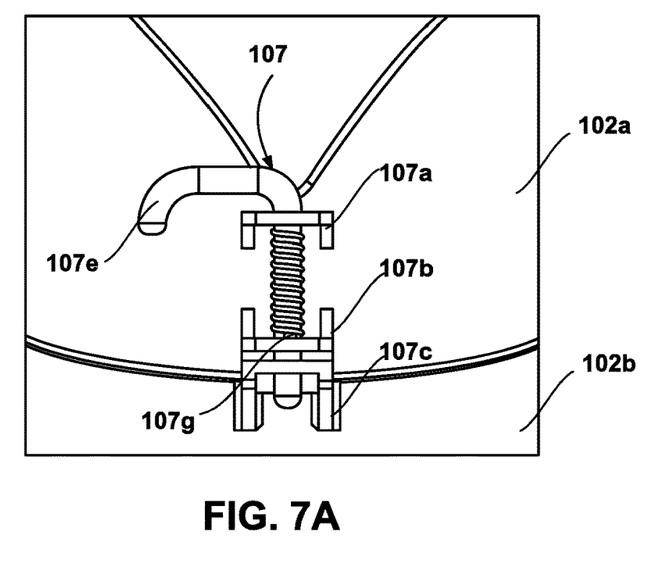
FIGS. 7A-7B shows a self-locking latch mechanism configured to lock and unlock the front door section of the body portion of the pet carrier.
Figure 7B:
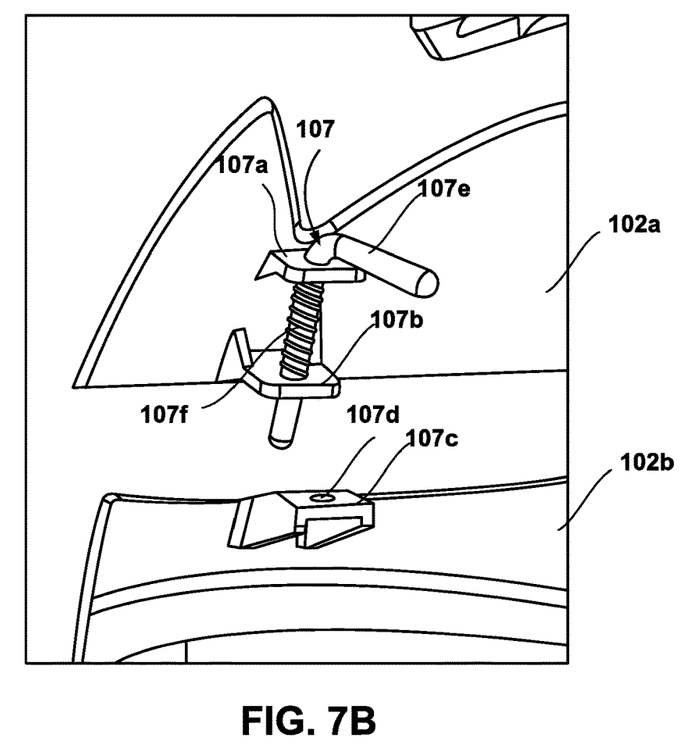

As described above, the front door section 102a is hingedly connected to the carrier body 102 and comprises an opening 102e that complements to the shape of the carrier body 102. Like the openings present on the sides or top of the head section 102b, the openings 102e at the front door section 102a also allows the air passage and helps the pet retained inside the pet carrier to view the environment outside. These opening 102e also helps the user in opening and/or closing the front door section 102a. In other words, the user can grip the front door section 102a through these opening in order to open it up or close it down. Further, as shown in FIGS. 7A and 7B, the front door section 102 a is configured to have a self-locking latch mechanism 107. The interior of the front door section 102 a is provided with a pair of brackets 107a, 107b located inlined with a bracket 107c configured interior of the head section 102b. The term "inlined" for the purpose of this application mean, along the same vertical axis. The brackets 107a, 107b and 107c comprises an opening such as opening 107d for a locking pin 107e to pass therethrough to lock the front door section 102a, when the user places the pet inside the pet carrier 100 (or the carrier body 102) and pull the door section 102a to close the door section 102a. The latch mechanism 107 further comprises a spring 107f wounded around the locking pin 107e, and a spring pin 107g disposed beneath the spring 107f and passes through the locking pin (107e) to facilitate automated latching. The spring 107f exerts a downward force on the spring pin 107g to facilitate locking as should be apparent to the person skilled in the art from FIG. 7A. Once the door section 102a is self-locked, the user can then when needed remove the spring pin 107g, and pull out the locking pin 107e to open the front door section (especially when the user has to free the pet or let the pet escape from out of the carrier body 102).

Figure 5A:
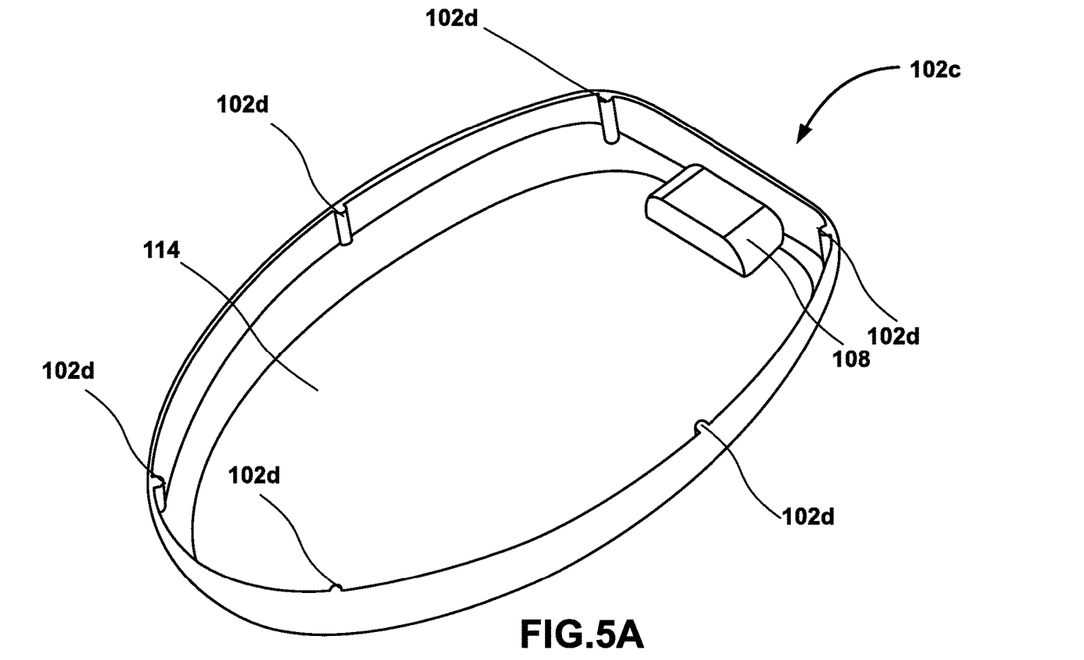
FIGS. 5A-5B shows a base section of the carrier body portion of FIG. 4.
Figure 5B:
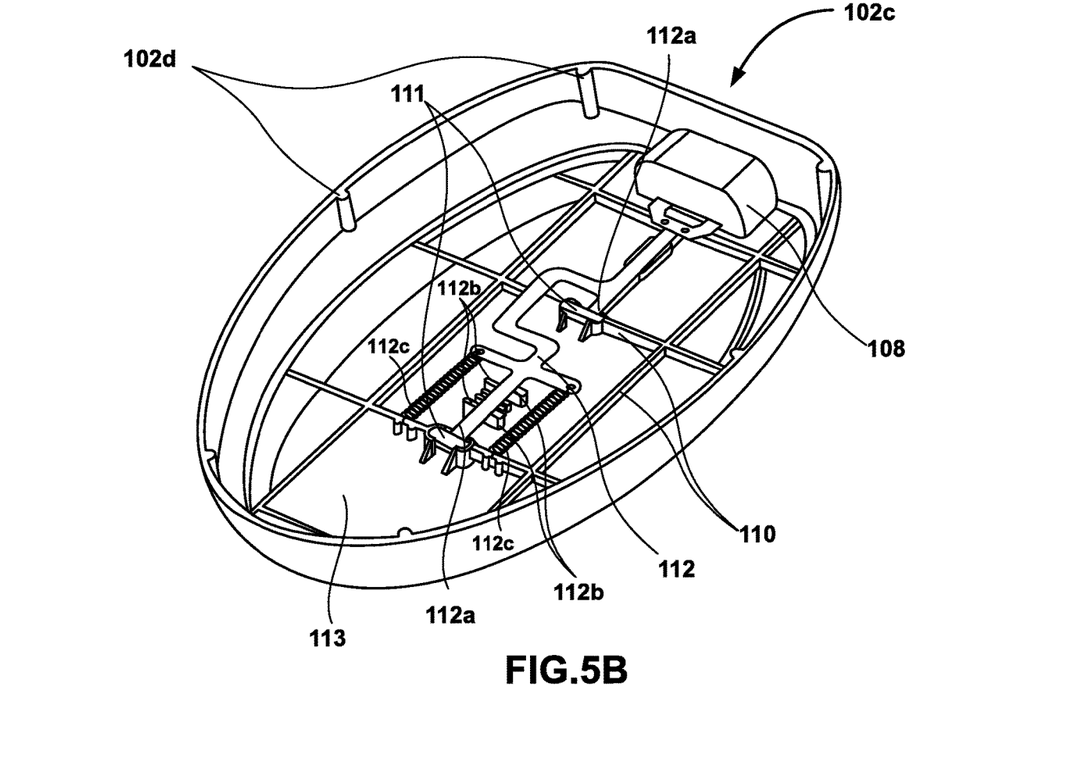
Figure 6A:
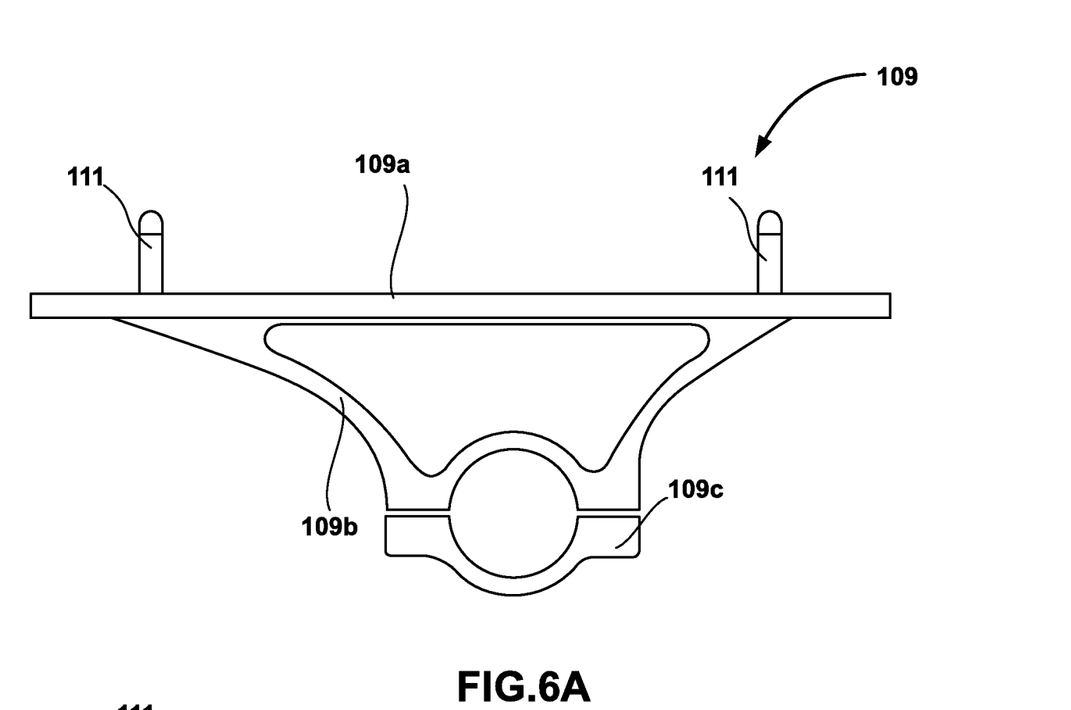
FIGS. 6A-6B shows a carrier support arrangement configured to selectively attach to and detach from the body portion of the pet carrier to facilitate mounting of the pet carrier onto the bicycle's handlebar.
Figure 6B:
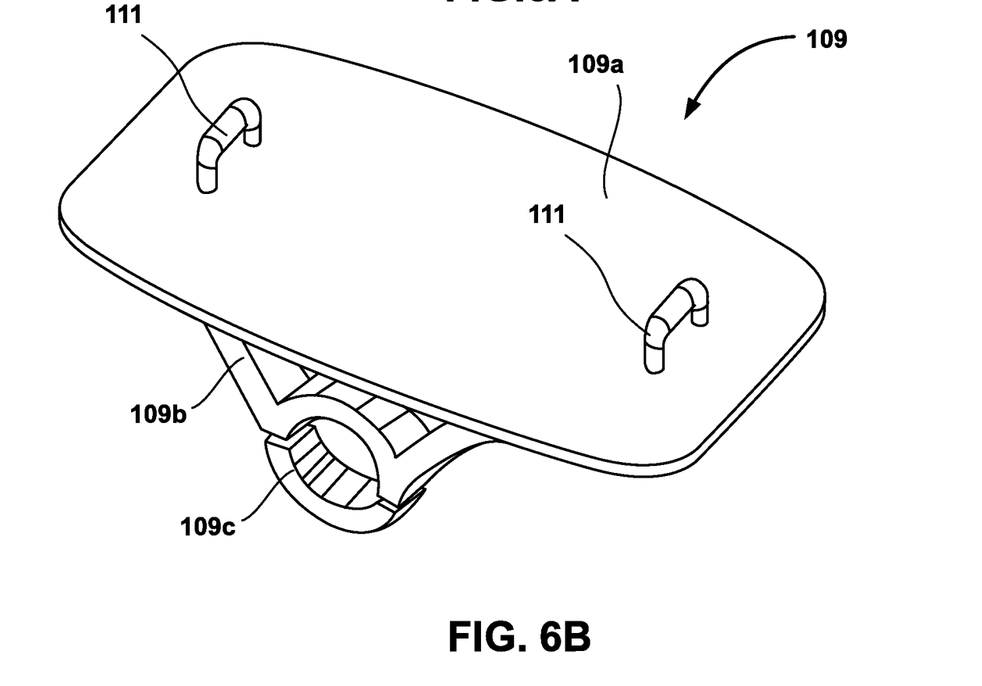

As shown in FIGS. 5A and 5B, the base section 102c of the carrier body 102 comprises a pull button 108. The pull button 108 is accessible from outside of the carrier body 102 as shown in FIG. 3. Further, the pull button 108 is operationally connected to a mounting/dismounting mechanism that allows the carrier body 102 to click over or removably attach on a first carrier support 109 (as shown in FIGS. 6A-6B) configured to mount the carrier body 102 onto a bicycle's handlebar (as shown in FIG. 8). To elaborate, the mounting/dismounting mechanism comprises various design features configured on the floor of the base section 102c. The design features include a plurality of rigid ribs 110, a pair of slots to receive a pair of hooks 111 from the carrier support arrangement 109 when the carrier body 102 is mounted on the carrier support 109. Further, the design features include a structural arrangement 112 with a pair of heads 112a to engage to or disengage from the hooks 111, and a set of guides 112b for ensuring the structural arrangement 112 don't deviate from its position during its movement triggered by actuation of the pull button 108. There is also presence of a pair of springs 112c that allows the structural arrangement 112 to regain its original position after the user releases the force applied on the pull button 108. According to the embodiment, the floor region 113 of the base section 102c is further covered with a piece of plastic material such as for example, a smooth plastic sheet 114 in order to ensure the pet when retained or placed inside the carrier body 102 can comfortably sit on top of the plastic sheet 114 without interfering with the mounting/dismounting mechanism present on the floor 113 of the base section 102c.

Referring to FIGS. 5B, 6B, and 8, in operation, when a user is required to mount the carrier body 102 over an upper surface area 109a of the carrier support arrangement 109 configurable on a bicycle handlebar 202, the carrier body 102 is first placed in such a way that the pair of hooks 111 present on the upper surface area 109a gets inserted within the pair of slots (not seen) present on the floor region 113 of the base section 102c of the carrier body 102. The user is required to pull the button 108 accessible from outside in order to allow the hooks 111 to get into the slots. This allows the hooks 111 on the carrier support arrangement 109 to connect to the base section 102c of the carrier body 102. Then in order to lock the hooks 111 within the base section 102c of the carrier body 102, the user is required to release the pulled button 108. As soon as the force on the pull button 108 is released the hooks 111 get locked within the base section 102c using the configured mounting/dismounting mechanism described above. Particularly, the pair of heads 112a engages to or disengage from the hooks 111 to lock or unlock the carrier body 102 over the carrier support arrangement 109. Next, if the user is required to dismount/release the carrier body 102 from the carrier support arrangement 109, the user can again pull the button 108 which then pulls the pair of heads of the structural arrangement 112 out from the hooks 111, unlocking the hooks 111 from the base section 102c. This enables the user to separate the carrier body 102 from the carrier support arrangement 109.

As to the next part of the installation of the pet carrier 100 on the bicycle handlebar 202, the underside of the carrier support arrangement 109 is provided with a platform support structures 109b, and 109c. The platform support structure 109b is fixedly engaged to the underside of the upper surface area 109a, whereas the platform support structures 109c removably engages to the support structures 109b to help the carrier support arrangement 109 to mount to or dismount from the bicycle's handlebar 202. The engagement of the support structures 109c with the support structures 109b is further facilitated by known fasteners such as screws. Once the carrier body 102 is mounted over the bicycle's handlebar 202 using the carrier support arrangement 109, the user can then operate the front door section 102a to open and place the pet inside the carrier body 102 and if required open the front door section 102a to release the retained pet therefrom.

Figure 9:
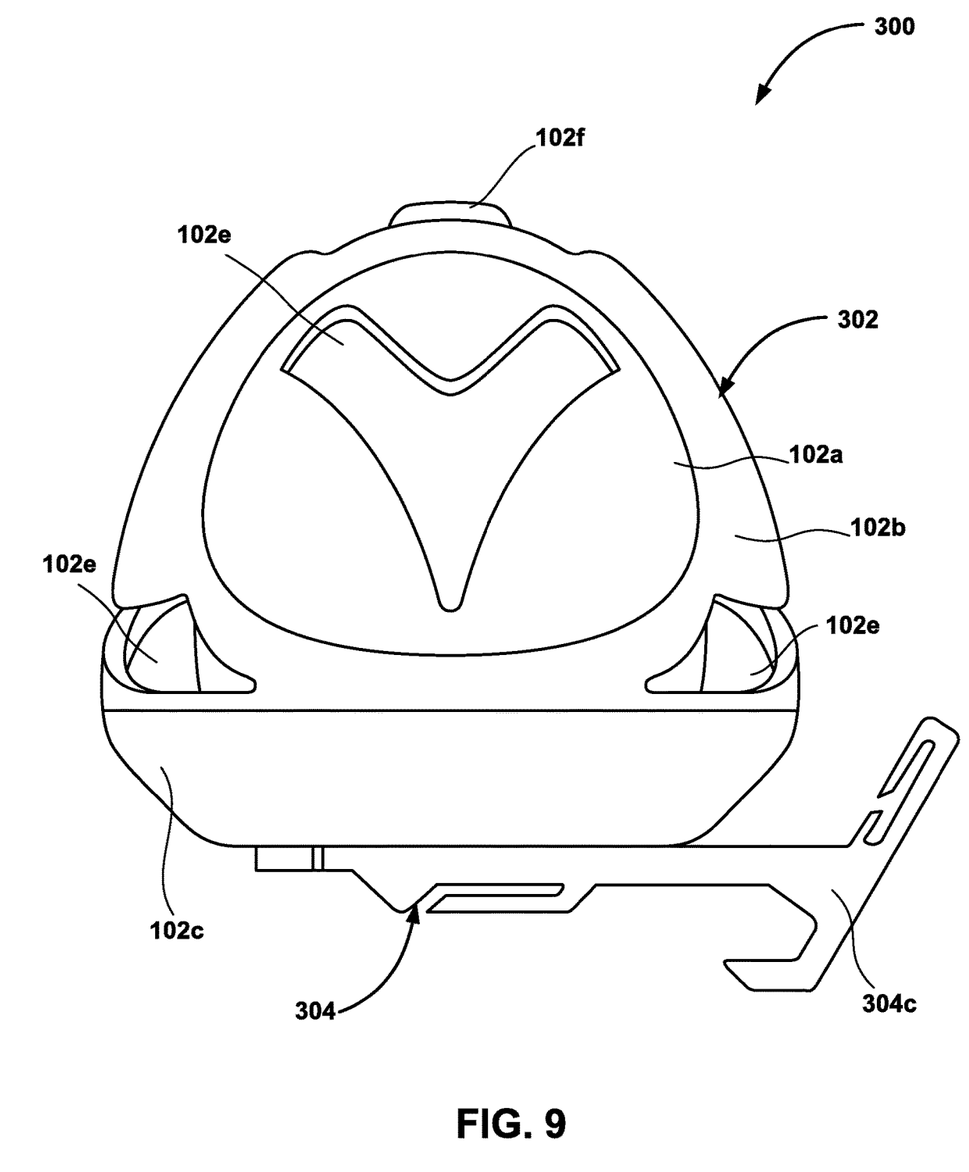
FIG. 9 shows a pet carrier mountable on a car's seat according to another exemplary embodiment of the present invention.
Figure 10A:
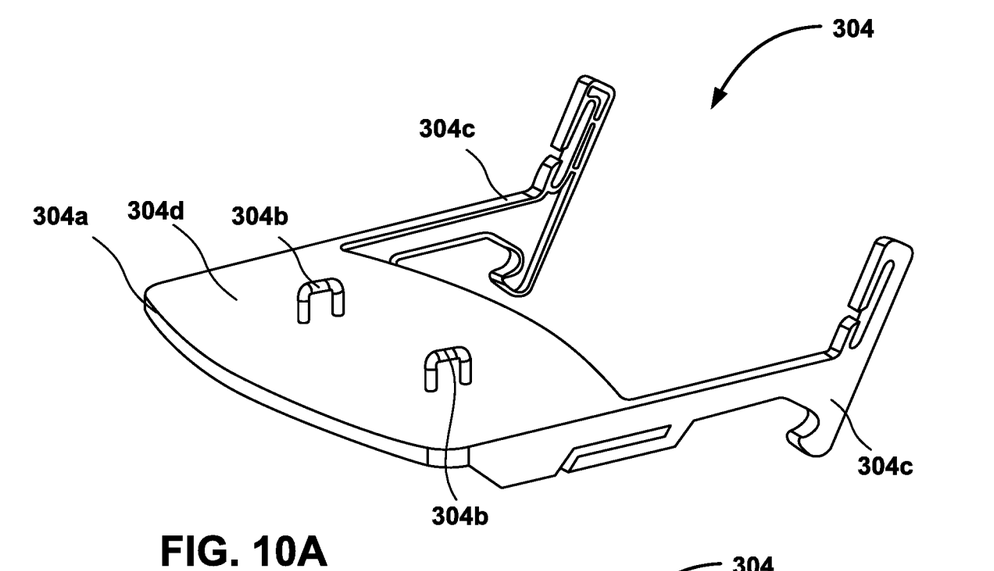
FIGS. 10A-10B shows a carrier support arrangement configured to selectively attach to and detach from the body portion of the pet carrier to facilitate mounting of the pet carrier onto the car's seat.
Figure 10B:
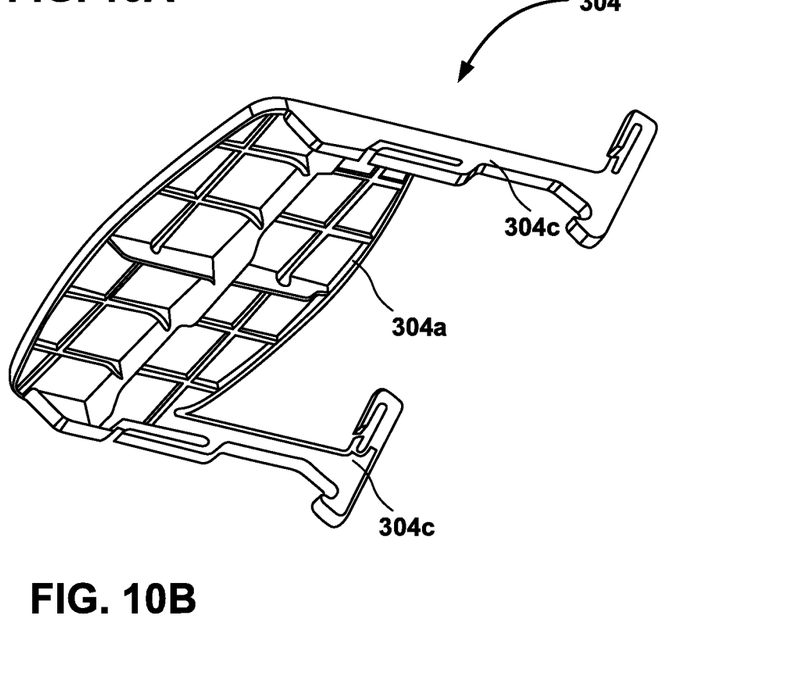
Figure 11:
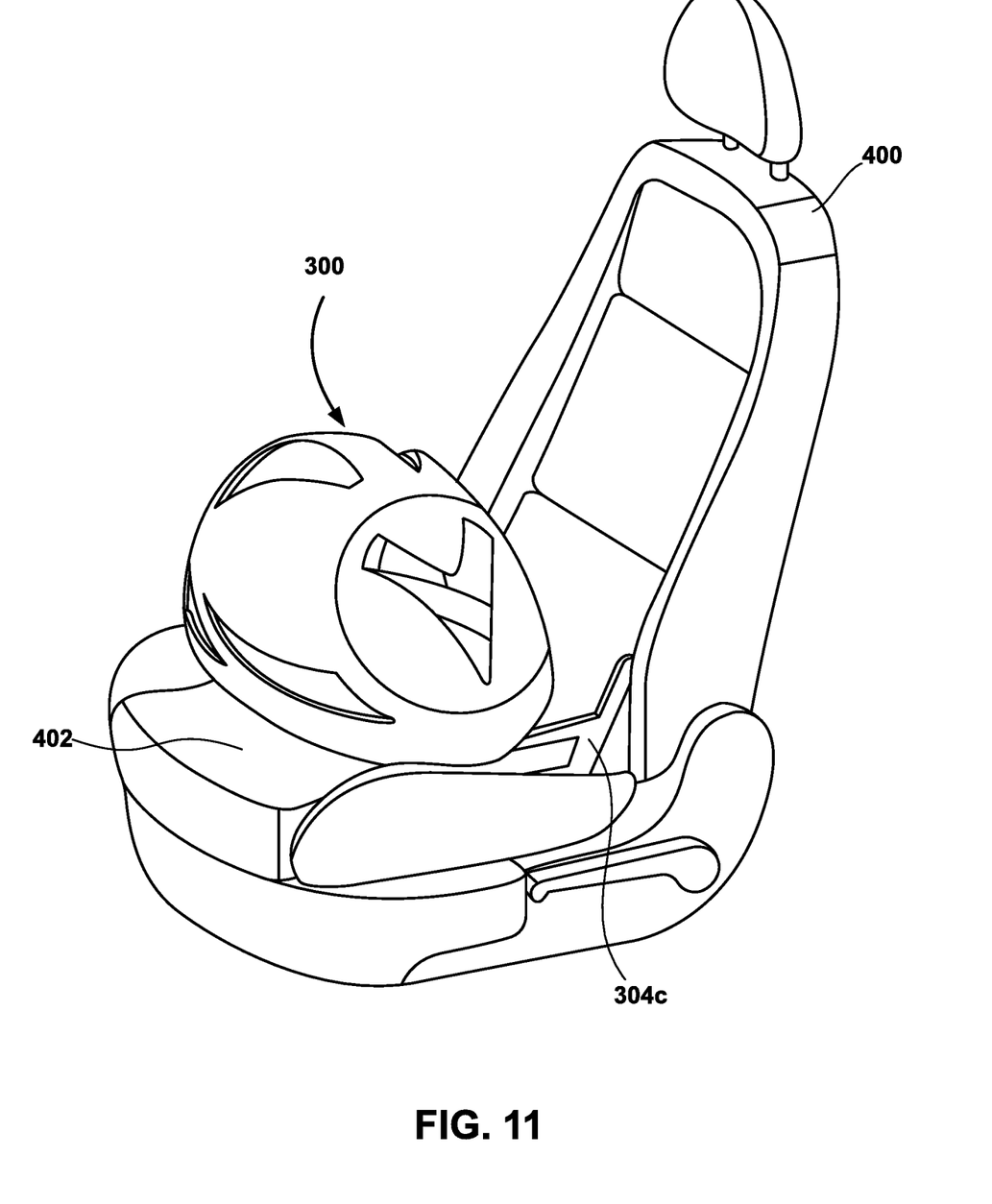
FIG. 11 shows the pet carrier of FIG. 9 mounted on the car's seat.

Referring now to FIGS. 9, 10A-10B, and 11, there is shown an alternative embodiment of the pet carrier 100 described above with respect to FIGS. 2-8. The pet carrier 300 includes a carrier body 302 similar to the carrier body 102 described above. According to this embodiment, all the components, parts, and features associated with the carrier body 302 are identical to the carrier body 102 that is described above with respect to FIGS. 2-8. However, this embodiment teaches a second carrier support arrangement 304 unlike that the carrier support arrangement 109 described above. Specifically, in this embodiment, the carrier support arrangement 304 is configured in way so that that the carrier body 302 (which is similar to the carrier body 102) can be mounted over a car's seat 400 (specifically over the seating area 402) as shown in FIG. 11. Although, for the purpose of this application, the embodiments described herein are used for mounting the pet carrier 100 onto the bicycle's handlebar 202 or car's seat 400, it should be understood that the pet carrier 100 may be mounted on other forms of vehicles such as a motorized bicycle, or the seats of other vehicles and not necessarily a car.

Referring to FIGS. 9-11 along with FIGS. 5A-5B, in operation, when a user is required to mount the carrier body 302 over a floor area 304a of the carrier support arrangement 304 configurable on a car's seat 400, the carrier body 302 is placed in such a way that a pair of hooks 304b present on an upper surface area 304d of the floor area 304a gets inserted within a pair of slots (not seen) configured on the floor 113 of the base section 102c of the carrier body 302. When this operation is being performed, the user is required to pull the button 108 accessible from outside. Once the carrier body 302 is placed over the floor area 304a of the carrier support arrangement 304, the pull button 108 is released to lock the hooks 304b within the base section 102c of the carrier body 302 via a mounting/dismounting mechanism described above. This operation is further facilitated by the set of springs 112c. Once the carrier body 302 is mounted on the car's seat 400 (particularly in the seat 402), the user can then operate a front door section 102a to open and place an intended pet inside the carrier body 302 and if required open the front door section 102a to release the retained pet therefrom. Next, if the user is required to dismount the carrier body 302 or the pet carrier 300 from the carrier support arrangement 304, the user can again pull the pull button 108 which then pulls the pair of heads 112a of the structural arrangement 112 out from the hooks 304b thereby enabling the user to separate the carrier body 302 from the carrier support arrangement 304. In order to facilitate mounting of the carrier body 302 on the car's seat 400, the carrier support arrangement 304 is further provided with a pair of side arms 304c provided on two sides of the floor area 304a. The two side arms 304c gets removably hooked into or fixed within the side corners of the seating region 402 as shown in FIG. 11 to allow for a seat belt to secure in place.

The pet carrier system of the present invention including associated components thereof, all those described above may be made using suitable metals preferably stainless steel or plastic, ABS or any other material or any combinations thereof and in variety of dimensions or sizes as needed. The use of material should not be construed as any limitation for implementation of the present invention; however, the material is desired to have good durability and at the same time should be inexpensive for the production and affordability of the end users.

Although particular embodiments of the invention have been described in detail for purposes of illustration, various modifications and enhancements may be made without departing from the spirit and scope of the invention.

I claim:

1. A pet carrier (100), comprising: a carrier body (102) comprising a front door section (102a), a head section (102b), and a base section (102c), the front door section (102a) is coupled to the head section (102b) and is selectively operable to open or close;
    a first carrier support arrangement (109) selectively attachable to and detachable from the carrier body (102) and configured for being removably attached to a structural component (202) of a bicycle (200);
    wherein, the front door section (102a) of the carrier body (102) having a self-locking latch mechanism (107) to allow locking and unlocking of the front door section (102), the self-locking latch mechanism (107) comprises a pair of brackets (107a, 107b) configured interior of the front door section (102a), and located inlined with a bracket (107c) configured interior of the head section (102b); a locking pin (107e) that passes through an opening (107d) provided in each of the brackets (107a, 107b, 107c) to lock the front door section (102a); a spring (107f) wounded around the locking pin (107e); and a spring pin (107g) disposed beneath the spring (107f) to pass through the locking pin (107e) for facilitating automated latching;
    Wherein the base section (102c) of the carrier body (102) having a pull button (108) operationally connected to a mounting and dismounting mechanism configured on the base section (102c) to allow the carrier body (102) to removably attach to or detach from the first carrier support arrangement (109), or the second carrier support arrangement (304); and
    Wherein the mounting and dismounting mechanism comprising a plurality of rigid ribs (110); a pair of slots to receive a pair of hooks (111 or 304b) from the first carrier support arrangement (109) or the second carrier support arrangement (304), when the carrier body (102 or 302) is mounted on the first carrier support arrangement (109) or the second carrier support arrangement (304): a structural arrangement (112) with a pair of heads (112a) to engage to or disengage from the pair of hooks (111), a set of guides (112b) for preventing any deviation of the structural arrangement (112) from its position when the pull button (108) is triggered: and a pair of springs (112c) that allows the structural arrangement (112) to regain original position after the force applied on the pull button (108) is released.

2. The pet carrier (100) of claim 1, wherein the carrier body (102) comprising one or more openings (102e) located on at least one of the front door section (102a), and the head section (102b).

3. The pet carrier (100) of claim 2, wherein the one or more openings (102e) are sized to allow an adequate amount of air to pass in and out of the carrier body (102), allow a pet retained inside the carrier body (102) to view outside and restrict the pet from escaping out of the carrier body (102).

4. The pet carrier (100) of claim 1, wherein the front door section (102a) is hingedly coupled to the head section (102b).

5. The pet carrier (100) of claim 1, wherein the head section 102b is screwed onto the base section 102c.

6. The pet carrier (100) of claim 1, wherein the carrier body (102) further comprising a handle (102f) configured at the top head section (102b) to facilitate carrying of the pet carrier (100) from one place to other.

7. The pet carrier (100) of claim 1, wherein the base section (102c) further comprising a smooth plastic sheet (114) that covers the mounting and dismounting mechanism to facilitate comfortable sitting to for the pet retained inside the carrier body (102) without interfering with the mounting/dismounting mechanism.

8. The pet carrier (100) of claim 1, wherein the first carrier support arrangement (109) comprising:
    an upper surface area (109a) of the carrier support arrangement (109);
    a pair of hooks (111) present on the upper surface area (109a) that gets inserted within the pair of slots present on the floor region (113) of the base section (102c) of the carrier body (102);
    a first platform support structure (109b), and a second platform support structure (109c), the first platform support structure (109b) fixedly engages to underside of the upper surface area (109a), and the second platform support structure (109c) removably engages to the support structures (109b) in order to mount the first carrier support arrangement (109) onto the bicycle's handlebar (202); and
    wherein the engagement of the second platform support structure (109c) to the first platform support structures (109b) is further facilitated by fasteners.

9. The pet carrier (100) of claim 1, wherein the structural component (202) of the bicycle (200) is a handlebar.

10. The pet carrier (100) of claim 1, wherein the spring (107f) is configured to exert a downward force on the spring pin (107g) to facilitate locking.

11. The pet carrier (100) of claim 1 further comprising a second carrier support arrangement (304) selectively attachable to and detachable from the carrier body (102 or 302) and configured for being removably attached to a car's seat (402).

12. The pet carrier (100) of claim 11, wherein the second carrier support arrangement (304) comprising:
- a floor area (304*a*) of the second carrier support arrangement (304) configurable on the car's seat (402);
- a pair of hooks (304*b*) present on an upper surface (304*d*) of the floor area (304*a*), the pair of hooks (304*b*) get inserted within the pair of slots present on the floor region (113) of the base section (102*c*) of the carrier body (102); and
- a pair of side arms (304*c*) provided on two sides of the floor area (304*a*), the pair of side arms (304*c*) gets removably hooked into or fixed within side corners of the car's seat (402).

\* \* \* \* \*